Aug. 16, 1932.  E. S. LEA  1,871,708
MACHINE MOUNTING
Filed May 20, 1929  2 Sheets-Sheet 1

INVENTOR.
Edward S. Lea
by Parker & Brocknow
ATTORNEYS.

Aug. 16, 1932.    E. S. LEA    1,871,708
MACHINE MOUNTING
Filed May 20, 1929    2 Sheets-Sheet 2

INVENTOR.
Edward S. Lea
By Parker & Prochnow
ATTORNEYS.

Patented Aug. 16, 1932

1,871,708

UNITED STATES PATENT OFFICE

EDWARD S. LEA, OF MORRISVILLE, PENNSYLVANIA, ASSIGNOR TO CARRIER ENGINEERING CORPORATION, OF NEWARK, NEW JERSEY

MACHINE MOUNTING

Application filed May 20, 1929. Serial No. 364,349.

This invention relates to improvements in machine mountings or bases for supporting and securing motors or other machines in proper position and deadening or reducing the transmission of sound incident to the operation of the machines.

One object of the invention is to provide a practical and desirable mounting or base by which a motor or other machine can be accurately placed and securely held in the required position, and which will prevent the transmission of sound between the machine and the supporting floor or foundation.

Other objects of the invention are to provide a practical machine mounting or base of economical construction whereby the machine can be accurately positioned and securely anchored in place without metallic contact between the metal base and the metal machine mounting plate or carrying member; also to provide a machine base or mounting of simple and inexpensive construction comprising complementary base and machine carrying members which are securely fastened together and held from relative lateral shifting, but are held out of metallic contact, and are permitted a limited yielding movement toward and from each other; also to improve machine mountings or bases in the other respects hereinafter described and set forth in the claims.

Figure 1:
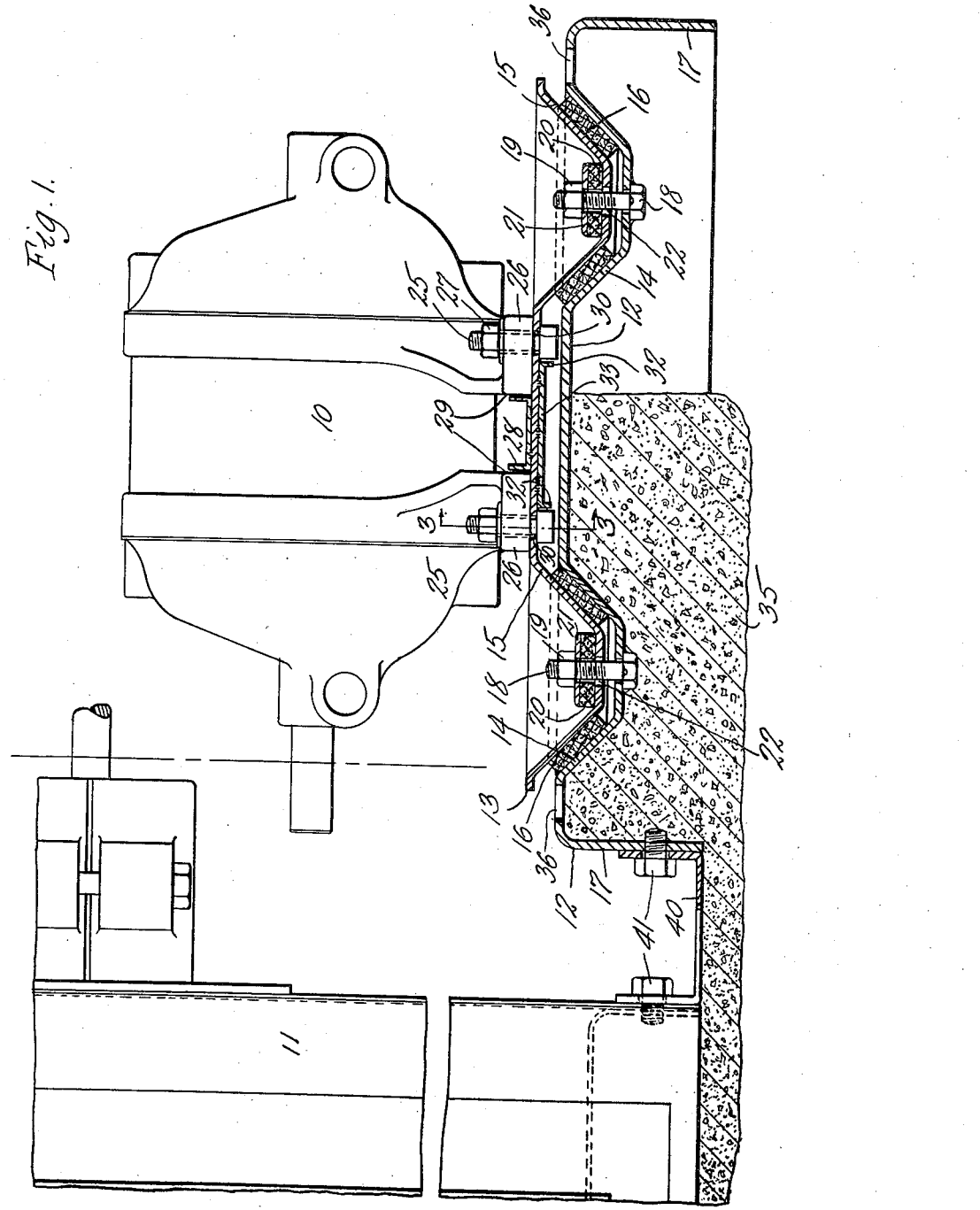
Fig. 1 is a sectional elevation of a mounting or base embodying the invention and showing a motor mounted thereon, and a portion of a blower or machine which is driven by the motor.

While the drawings illustrate and this specification describes my improved mounting in connection with a motor, the invention is not restricted to a motor mounting, since the mounting is adapted for use with other machines.

10 represents an electric motor and 11 represents a portion of the casing of a blower or other machine which is adapted to be belted to and driven by the motor.

My improved mounting comprises a base plate or member 12 which is stationarily secured in position on a suitable foundation, and a mounting or carrying plate or member 13 which is securely fastened on the base 12 but held out of contact therewith, and supports or carries the motor or other machine which may be bolted to the carrying plate.

The two members 12 and 13 are provided with complementary tapered sockets or seats 14 and projections 15 arranged so that the projections of one member are adapted to center in the sockets or seats of the other member and bear on washers or bodies 16 of non-conducting material interposed between the seats 14 and the projections 15, whereby the mounting member 13 is prevented from lateral shifting on the base member and is held out of metal contact therewith. Preferably the base member 12 consists of a metal plate stamped or pressed to form the sockets or depressions 14, which are preferably four in number, and of frusto-conical form. The carrying member 13 also preferably consists of a metal plate stamped or pressed to provide the projections 15 which correspond in number and shape with and are adapted to enter the depressions 14 of the base member and rest on the washers 16. A depending marginal flange 17 is also preferably formed on the base plate.

The carrying plate 13 is firmly secured or bolted to the base plate 12, preferably by bolts 18, which pass through central holes in the conical seats 14 and projections 15, and nuts 19 screwed on the bolts. Washers 20 of non-conducting material are interposed between the nuts and the ends of the hollow projections 15 on the carrying plate 13. Ordinary metal or lock washers 21 may be employed between the nuts 19 and the non-conducting washers 20. Preferably the heads of the bolts are welded to the bottom face of the base plate 12 so that the bolts are rigid with the plate, and the bolt holes 22 in the carrying plate are larger in diameter than the bolts so that the bolts will not have metal contact with the carrying plate.

The washers 16 and 20 can be made of any suitable resilient or yielding material which is a good non-conductor of sound. The washers 16 are preferably of the annular frusto-conical shape shown so as to fit the conical faces of the seats 14 and projections 15. Cork has been found desirable for the washers. Since the metal plates 12 and 13 are held out of contact with each other by the non-conducting pads 16, and the washers 20 prevent contact between the nuts 19 and the carrying plate 13, while the bolts 18 do not contact with the plate 13, there is no metallic sound-conducting path or part by which sounds can be conducted from one plate to the other. Nevertheless the interfitting tapering projections and sockets center the plates accurately with reference to each other and firmly hold the plates against relative lateral shifting.

The motor 10 is preferably secured rigidly to the carrying plate 13 by bolts 25 which pass upwardly through registering holes in the carrying plate 13 and in feet or lugs 26 on the motor frame, with nuts 27 screwed on the threaded upper ends of the bolts 25.

Figure 2:
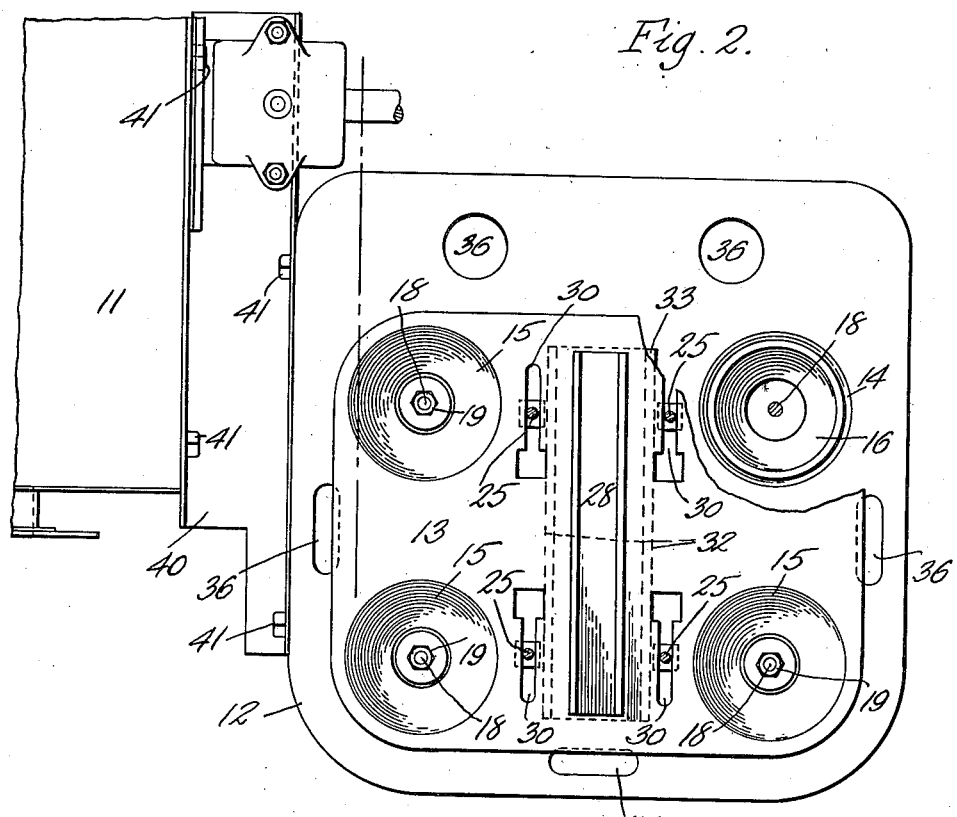
Fig. 2 is a plan view, partly broken away, of the motor mounting or base and the driven machine.
Figure 3:
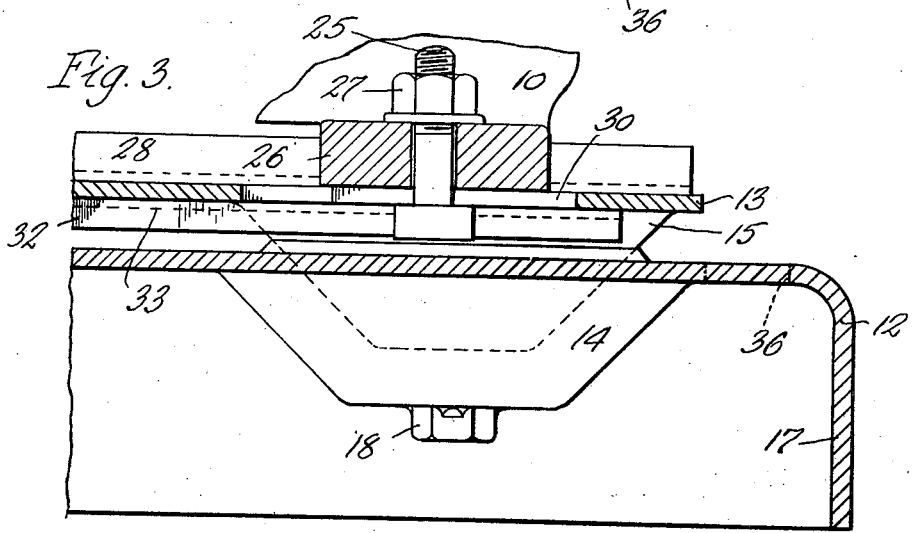
Fig. 3 is a fragmentary transverse sectional elevation of the mounting on an enlarged scale, on line 3—3, Fig. 1.

In order to accurately position the motor on the base and accurately aline it with reference to the blower or machine to be driven by the motor, the carrying plate is provided with an upwardly projecting positioning guide for the motor. This guide may be formed by a channel bar 28 welded on the top face of the carrying plate. When securing the motor on the carrying plate 13, the feet or lugs 26 of the motor are placed so as to straddle the guide channel 28 with the inner faces 29 of the feet 26 engaging the upwardly projecting side flanges of the guide channel 28 which thereby determines the position laterally of the motor on the carrying plate. However, the motor is adapted to be adjusted on the carrying plate, parallel with the guide 28, toward and from the shaft of the driven machine to suit varying belt pulley centers. For this purpose, the carrying plate is preferably provided with elongated bolt slots 30 through which the bolts 25 pass, these slots being parallel with the guide faces of the guide 28 and permitting the required adjustment of the motor on the carrying plate. These bolt slots 30 may be of key-hole shape, see Fig. 2, having ends large enough to permit the bolt heads to pass therethrough. This permits ready assembly of the motor on the carrying plate, since the heads of the bolts can be passed through the large ends of the slots 30, and the bolts then moved along in the narrow portions of the slots until the motor is in the required position, when the motor is rigidly secured on the carrying plate by tightening the nuts 27. 32 represents projections on the underside of and extending parallel with the bolt slots 30 in position to engage the adjacent sides of the bolt heads to prevent the bolts from turning when tightening the nuts on the bolts. These projections are conveniently formed by depending side flanges on a plate 33 welded to the underside of the carrying plate.

The base plate or member 12 can be secured in place in any suitable manner, for instance by setting the base member in a cement foundation 35, and the base plate is preferably formed with openings 36 through which the grout for the foundation can be readily poured.

40 represents a spacing or positioning member adapted to be secured to the adjacent portions of the base plate 12 and the base of the blower 11, as by bolts 41 inserted through definitely located holes in the parts 40, 12 and 11. This spacing member holds the motor base and blower frame rigidly together as parts of a unitary structure while the machines are being set, so that there can be no misplacement of one part with reference to the other, and thereby always insuring the accurate relative position of the motor base and the machine 11. After the foundation of grout has set and the motor base 12 and machine 11 are rigidly secured in place, the spacing or connecting member 40 is disconnected from the motor base and machine 11 and removed so that there will not be any metallic connection between these parts for transmitting sound from one machine to the other.

Thus, since the motor base member 12 occupies a definite relation to the blower 11 and the position of the motor on the carrying plate and of the carrying plate on the base plate are definitely fixed, as before explained, the motor and blower will necessarily be properly alined with each other when the parts are secured in place. While the yielding bodies 16 may permit a slight yielding of the carrying plate toward and from the base plate caused by an unbalanced motor, the described construction effectually prevents any lateral shifting of the carrying plate or motor due to side pull thereon by the belt.

I claim as my invention:

1. In a machine mounting, the combination of a base plate and a machine-carrying plate, one integrally formed with a plurality of tapering straight faced sockets and the other integrally formed with a like number of correspondingly tapered projections arranged with each projection seated in one of said sockets, bodies of sound-deadening material in said sockets around said projections and on which said projections bear to hold said plates out of contact, fastening devices which secure said plates together and are out of contact with one of said plates, and sound-deadening material interposed between said fastening devices and said other plate, whereby said plates are located and held in substantially fixed relation to each other and the transmission of sound from one plate to the other is reduced.

2. In a machine mounting, the combination of a base plate and a machine-carrying plate each consisting of a sheet metal stamping, one formed with a plurality of tapering sockets, and the other formed with a corresponding number of hollow tapered projections arranged to seat in said sockets, annular yielding bodies surrounding said projections between the same and said sockets and on which said projections rest, bolts extending through central holes in said sockets and projections out of contact with one of said plates, yielding washers surrounding said bolts within said hollow projections, and nuts screwed on said bolts above said yielding washers.

EDWARD S. LEA.